United States Patent
Pfaff et al.

(10) Patent No.: US 11,298,761 B2
(45) Date of Patent: *Apr. 12, 2022

(54) ADZER BIT WITH CUTTING SEGMENTS

(71) Applicant: Good Earth Tools, Inc., Crystal City, MO (US)

(72) Inventors: Daryl A. Pfaff, Ste. Genevieve, MO (US); Raymond W. Burns, Bethalto, IL (US)

(73) Assignee: Good Earth Tools, Inc., Crystal City, MO (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/506,698

(22) Filed: Jul. 9, 2019

(65) Prior Publication Data

US 2019/0329334 A1 Oct. 31, 2019

Related U.S. Application Data

(63) Continuation of application No. 14/970,103, filed on Dec. 15, 2015, now Pat. No. 10,357,834.

(51) Int. Cl.
| | |
|---|---|
| *B27G 13/10* | (2006.01) |
| *B23C 5/22* | (2006.01) |
| *B23C 5/18* | (2006.01) |
| *E01B 29/00* | (2006.01) |
| *E01B 31/00* | (2006.01) |
| *E01B 31/20* | (2006.01) |

(52) U.S. Cl.
CPC .............. *B23C 5/2295* (2013.01); *B23C 5/18* (2013.01); *B23C 5/22* (2013.01); *B23C 5/2226* (2013.01); *B27G 13/10* (2013.01); *E01B 29/00* (2013.01); *E01B 31/00* (2013.01); *E01B 31/20* (2013.01); *B23C 2240/08* (2013.01)

(58) Field of Classification Search
CPC ...... B27G 13/00; B27G 13/005; B27G 13/02; B27G 13/04; B27G 13/06; B27G 13/08; B27G 13/10; B27G 13/12; B23C 5/226; B23C 5/2234; B23C 5/2291; B23C 2200/045; A01G 23/06; A01G 23/067
See application file for complete search history.

(56) References Cited

U.S. PATENT DOCUMENTS

| | | | |
|---|---|---|---|
| 3,486,542 | A | 12/1969 | Blackwell |
| 4,506,715 | A | 3/1985 | Blackwell |
| 5,626,201 | A | 5/1997 | Friant et al. |
| 5,645,323 | A | 7/1997 | Beach |
| 6,659,694 | B1 | 12/2003 | Asbell et al. |
| 7,484,541 | B2 | 2/2009 | Green |
| 8,858,130 | B2 | 10/2014 | Morrison et al. |
| 9,011,049 | B2 | 4/2015 | Fang et al. |
| 2017/0259356 | A1 | 9/2017 | Lee et al. |

*Primary Examiner* — Matthew Katcoff
(74) *Attorney, Agent, or Firm* — Foley & Lardner LLP

(57) ABSTRACT

An adzer bit includes a support member that defines a through hole that is configured to receive a fastener. The support member includes a cap portion and a base portion. The support member also defines an annular slot that is axially disposed between the cutting segment cap portion and the base portion. A plurality of cutting segments are received and secured in the annular slot. The material of the plurality of cutting segments is harder than the material of the support member.

20 Claims, 3 Drawing Sheets

ADZER BIT WITH CUTTING SEGMENTS

CROSS REFERENCE TO RELATED APPLICATIONS

This application is a continuation of U.S. patent application Ser. No. 14/970,103, filed Dec. 15, 2015, now pending, the disclosure of which is incorporated herein by reference.

TECHNICAL FIELD

This invention relates in general to an adzing apparatus of the type utilized to cut railroad crossties, and more particularly to an adzer bit with a segmented cutting structure.

BACKGROUND OF THE DISCLOSURE

In the maintenance of railroads, the crossties of a rail bed are cut to form grooves or seats in the ties for the reception of rail chairs, which support the rails. Adzing tools are used to cut the railroad crossties. For example, one or more adzer heads are rotated about a vertical axis and moved along a railroad track to progressively cut the upper surfaces of the railroad crossties for the placement of rails along the crossties. Each adzer head includes a plurality of adzer bits, which are rotated by the adzer head in an orbit about the vertical axis. The adzer bits each include an annular cutting structure that is typically formed of hardened metal that cuts into the crossties. In order that the cutting bits last for a long time, it is desirable that they be fabricated of very hard material; however, the very hard materials are brittle and are subject to chipping and cracking during use. Portions of the annular cutting structure are protected by a shield member, which is typically made of a softer material than the cutting structure. During use, the shield member wears away to progressively expose the cutting edge of the annular cutting structure.

U.S. Pat. No. 4,506,715 to Blackwell entitled "Adzing Bit Assembly" is hereby incorporated by reference and discloses a conventional adzer bit with a unitary annular cutting structure. Portions of the '715 patent are briefly shown and described below as an example of conventional adzer head assembly.

Reference is made to FIG. 1, which illustrates a conventional adzer head 10 supporting a plurality of adzer bit assemblies 25 about its periphery. The adzer head 10 includes a central opening 11 that is coaxial with the center 12 of the adzer head 10 and a circular array of smaller openings 13 which are circumferentially spaced about the adzer head 10. The central opening 11 is shaped to fit over a hub of a fly wheel or other rotary drive means, (not shown) while the openings 13 are adapted to be aligned with similar openings of the flywheel and to receive connecting screws. The adzer head 10 is rotated in the direction of arrow 16 about a vertical axis which is coaxial with the center 12 of the adzer head 10. A plurality of bit support portions 15 are disposed radially from a central portion of the adzer head 10. The bit support portions 15 are equally spaced apart from each other circumferentially. The bit support portions 15 provide opposed parallel mounting surfaces 18 and 19, with the leading surface 18 of each bit support portion 15 formed in a plane that extends through the center 12 of the adzer head 10. A cylindrical bore 20 through each bit support portion 15 is oriented in a plane perpendicular to the axis of rotation of the adzer head 10 and perpendicular to the opposed parallel mounting surfaces 18 and 19.

With reference to both FIGS. 1 and 2, an adzer bit assembly 25 includes a shield 26, an annular cutting structure 27, a support member or bushing 28 and a connector bolt 29. The shield 26 protects the annular cutting structure 27 and defines a central cylindrical through hole 33. Annular cutting structure 27 includes opposed parallel first and second support or bearing surfaces 40 and 41, peripheral surface 42, and central cylindrical through hole 43.

The support member or bushing 28 also includes a central cylindrical through hole 53. A first large diameter hub 54 extends toward the trailing mounting surface 19, and a second smaller diameter hub 55 protrudes from the large diameter hub 54, with the hubs 54 and 55 being coaxial with respect to the support member 28. The facing surfaces of the annular cutting structure 27 and of the support member 28 are silver soldered together.

The central cylindrical opening 33 of the shield 26 is fitted about the smaller diameter hub 54 so that it is in facing relationship with respect to the annular cutting structure 27. The cylindrical opening 33 is press-fit about the smaller diameter hub 54 of the support member 28. The connector bolt 29 is then inserted through the bore 20 of a bit support 15 of the adzer head 10, and the nut 62 is threaded onto the protruding threaded end portion 61 of the bolt 29. A washer 65 is positioned between the nut 62 and the mounting surface 18 of the bit support portion of the adzer head 10.

The annular cutting structure is typically formed of an ultra-hard material and is therefore brittle and subject to cracking during use. A crack that initiates in one portion of the annular cutting structure 27 may propagate to other portions of the annular cutting structure 27 and thereby reduce the structural integrity of the annular cutting structure 27 such that it breaks away or otherwise is no longer an efficient cutter and must be replaced. Frequent replacement of adzer bits is inefficient and costly.

SUMMARY

An adzer bit according to the teaching of the present disclosure includes a support member that defines a through hole that is configured to receive a fastener. The support member includes a cutting segment cap portion and a base portion. The support member also defines an annular slot that is axially disposed between the cutting segment cap portion and the base portion. A plurality of abutted cutting segments are received and secured in the annular slot. The material of the plurality of cutting segments is harder than the material of the support member.

According to an embodiment, the support member is a single, unitary body having an annular slot. Each one of the plurality of abutted cutting segments may be brazed or otherwise bonded to the surfaces defining the annular slot.

According to an alternate embodiment, the support member is formed by joining a base member that is initially a separate part from a cutting segment cap member. The abutted cutting segments are positioned peripherally around a boss that extends from either the base member or the cap member. The plurality of abutted cutting segments, the base member, and the cap member are fitted together and joined by a suitable bonding technique.

Technical advantages of the adzer bit according to the teachings of the present disclosure include separate cutting segments that may be joined by a brazing material. If one of the cutting segments is cracked or otherwise weakened, the crack will not propagate through the brazing material to an adjacent cutting segment because the cutting segments are separate parts. Thus, if one cutting segment is cracked and is unable to efficiently perform its cutting function, other cutting segments, for example three other cutting segments, of the adzer bit remain structurally strong and able to cut. Thus, the adzer bit is durable and has an increased useful life over conventional adzer bits with unitary body ring cutting structures.

Other technical advantages include forming an annular slot in a single unitary body to hold the abutted cutting segments. Because the cutting segments are not in a ring shape, each one may be received in a slot. Moreover, the slot provides additional surfaces for brazing than is available for brazing in a conventional adzer bit that includes a multi-piece support body that is assembled to contain a unitary ring cutting structure.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments. The drawings are not to scale and show only some embodiments. Other embodiments that are not specifically illustrated are within the scope of this disclosure. Embodiments shown in one figure may be combined with embodiments shown in other figures to create further embodiments.

DETAILED DESCRIPTION

Figure 1:
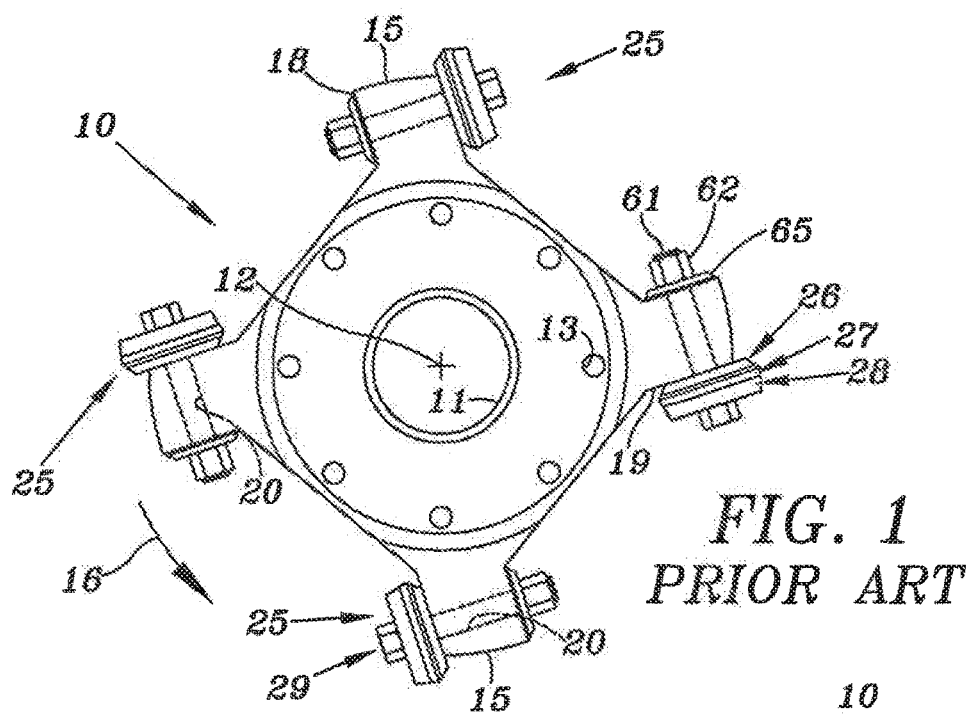
FIG. 1 is a top, plan view of a prior art adzer head supporting prior art adzer bit assemblies.
Figure 2:
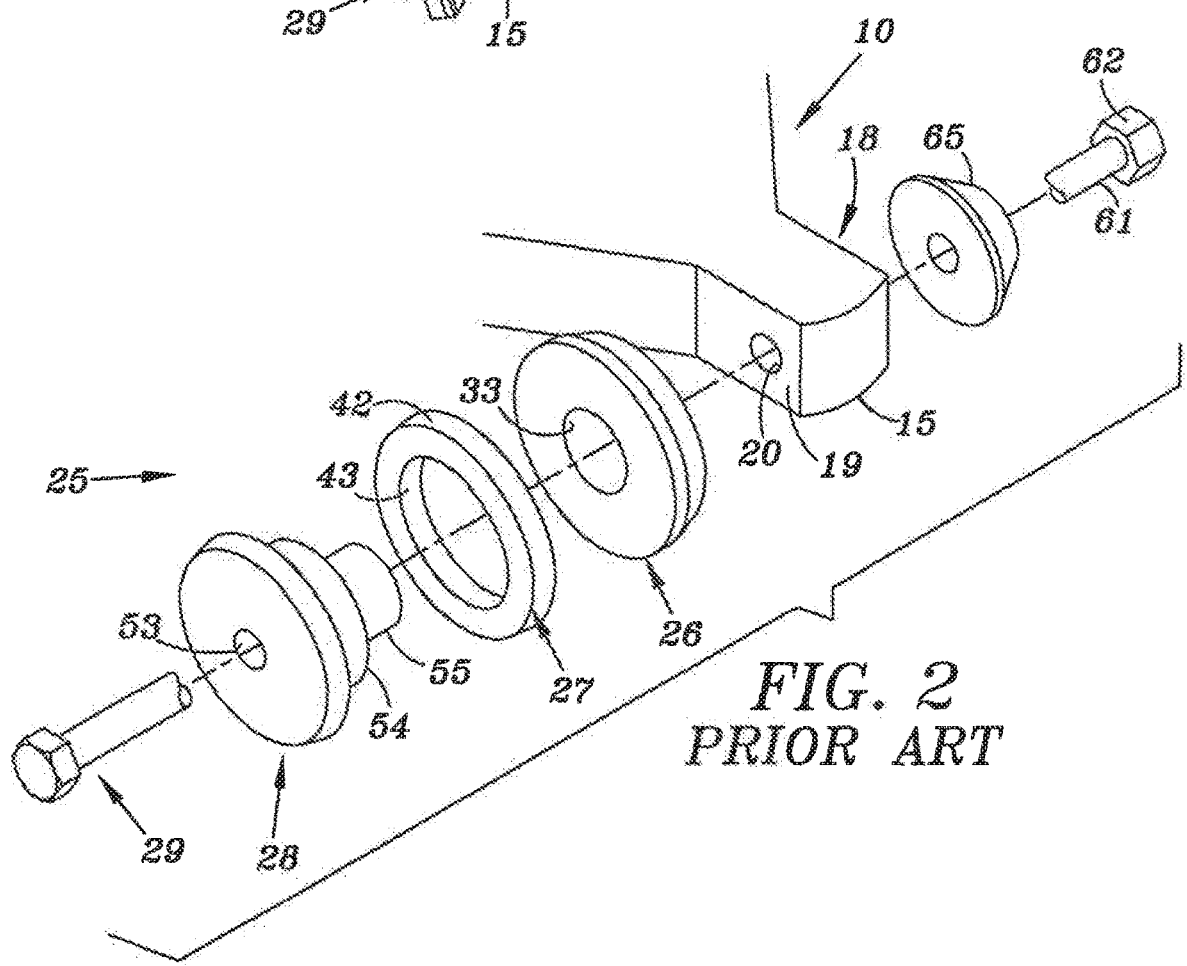
FIG. 2 is an exploded isometric view of a prior art adzer bit assembly.
Figure 3A:
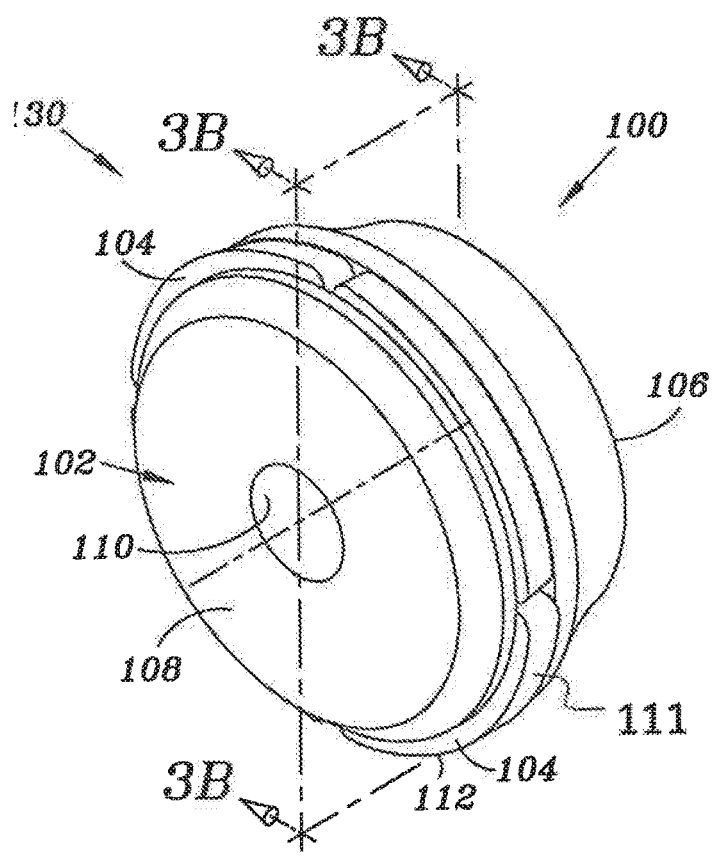
FIG. 3A is an isometric view of an adzer bit according to the teachings of the present disclosure.

Reference is made to FIG. 3A, which is an isometric view of an adzer bit 100 according to embodiments of the present disclosure. The adzer bit 100 includes a segmented cutting structure that is more durable than a conventional unitary ring cutting structure because cracks can be isolated to the particular cutting segment, and the other cutting segments may be left intact and still able to cut. According to one embodiment, the adzer bit 100 includes a unitary body support member 102 that holds a plurality of cutting segments 104. The support member 102 has a base portion 106 and a cap portion 108 where the cutting segments 104 are disposed between the cap portion 108 and the base portion 106. The cap portion 108 serves to protect the cutting segments 104, and therefore is disposed in front of or leading the cutting segments 104 as the adzer head rotates the bit 100. The adzer bit 100 is secured to a peripheral support portion of an adzer head, as described above with respect to FIG. 1. The adzer bit 100 is generally circular, but any suitable shape of the adzer bit 100 is contemplated by the disclosure. A through-hole 110 extends through the support member 102 and is configured to receive a suitable fastener, such as a bolt, to the secure the adzer bit 100 to the adzer head 102.

Each cutting segment 104 defines an outer arcuate surface 111 that supports a cutting edge 112. According to one embodiment, the cutting edge 112 extends radially beyond the outer perimeter of the cap portion 108. According to an alternate embodiment, the cap portion 108 substantially covers the cutting segments such that a perimeter of the cap portion is coextensive with the perimeter of the cutting segments 104. In this embodiment, the cap portion 108 is worn away in use to progressively reveal a cutting edge 112 of one or more cutting segments 104.

The cutting segments 104 are formed of a material that is harder than the material of the support member 102. In certain embodiments, the cutting segments 104 are formed of suitable carbide material, such as tungsten carbide. Any suitable material that can cut and abrade a surface, such as a wood crosstie, may be used to form the cutting segments 104. For example, the cutting segments 104 may be formed of a ceramic material, a tool-grade steel, or a diamond material. The support member 102 is formed of a material that is softer than the material of the cutting segments 104. For example, the support member 102 may be formed of steel. For example, the support member 102 may be made of air hardened steel such that it may be machined, then heated to facilitate brazing, as described further below, then upon cooling will harden to be harder than the original steel that was machined. According to other embodiments, the support member 102 may be formed from manganese, hardened steel, or mild steel, such as A36 grade steel.

Figure 3B:
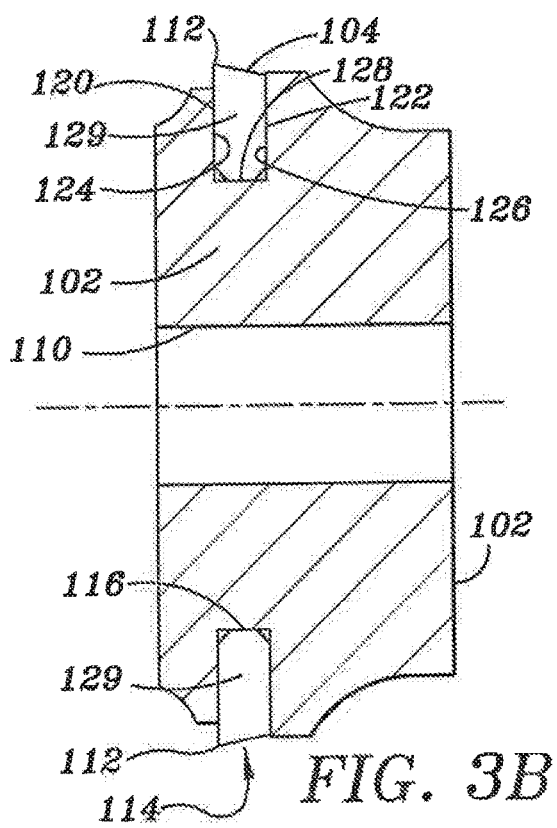
FIG. 3B is a cross-section of the adzer bit of FIG. 3A.

Reference is now made to FIG. 3B, which is a cross-section of the adzer bit 100 taken between adjacent cutting segments 104, and reference is also made to 3C, which is an exploded, isometric view of the adzer bit 100. An annular slot 114 is formed, for example machined, in the single unitary body of the support member 102. The slot may be machined in a manner that generally avoids creating squared intersections of surfaces, which may be stress risers and form weak areas of the adzer bit 100. According to one embodiment, the annular slot 114 is machined to receive an inner arcuate portion 116 of the cutting segments 104, where the inner portion 116 includes a pair of inner bevels 118.

The plurality of cutting segments 104 are received and secured in the annular slot 114 by any suitable bonding or joining process. According to one embodiment, the cutting segments 104 are brazed in the annular slot 114. Because the cutting segments 104 are received in the annular slot 114, brazing may form a stronger bond with the cutting segments 104 and the support member 102 than the bond formed between the annular cutting structure and the supporting structure of conventional adzer bits. By brazing the cutting segments 104 into the annular slot 114, three surfaces of a cutting segment 104 may be bonded to the support member 102 with a brazing material. Brazing material is applied to secure both a leading surface 120 and a trailing surface 122 of a cutting segment 104 to a corresponding leading surface 124 and a trailing surface 126 of the annular slot 114. In addition, the inner portion 116, including the pair of inner bevels 118, is brazed to corresponding floor surfaces 128 of the annular slot 114. Other suitable bonding techniques such as an adhesive, welding, or soldering may be used to bond the cutting segments 104 to the support member 102. Mechanical fastening may also be used. For example, the cutting segments 104 may be secured in the annular slot 114 using set screws or other suitable mechanical fastener.

Each of the cutting segments 104 form a section of a ring shape. In the illustrated embodiment, each cutting segment 104 forms a ninety degree (90°) arc portion of a complete ring. This disclosure contemplates any suitable number of cutting segments 104 in the adzer bit 100. For example, a single cutting segment 104 may be in the shape of a semi-circle, and a second cutting segment 104 may also be in the shape of a semi-circle. Alternatively, each cutting segment 104 may occupy approximately 45 degrees (45°) of a ring shape, and thereby eight separate cutting segments 104 may form a ring shape. In an alternate embodiment, each cutting segment 104 may occupy one-third (120°) of a full ring shape.

Preferably, the cutting segments 104 are abutted with an adjacent cutting segment 104 to form the ring shape. In certain embodiments an end 129 of a cutting segment 104 may contact an end 129 of an adjacent cutting segment 104. In other embodiments, a small gap or clearance separates ends 129 of two adjacent cutting segments 104. The gap, which may be a few thousandths or hundredths of an inch, may be filled with brazing material such that one cutting segment 104 is brazed to an adjacent cutting segment 104. Although the cutting segments 104 are brazed to each other, a crack or fracture will not propagate from one cutting segment 104 through the brazing material to the adjacent cutting segment 104. According to an alternate embodiment, a shim may be positioned between adjacent cutting segments 104 and the shim may be brazed or otherwise bonded to both of the adjacent cutting segments 104.

In certain embodiments, the adzer bit 100 may be rotated about a bit axis with respect to the support portion of the adzer head to position an unused cutting segment 104 in a cutting position. Accordingly, a single adzer bit 100 having a segmented cutting structure, according to the embodiments of the present disclosure, may have a longer useful life and be more durable than conventional adzer bits.

Figure 5:
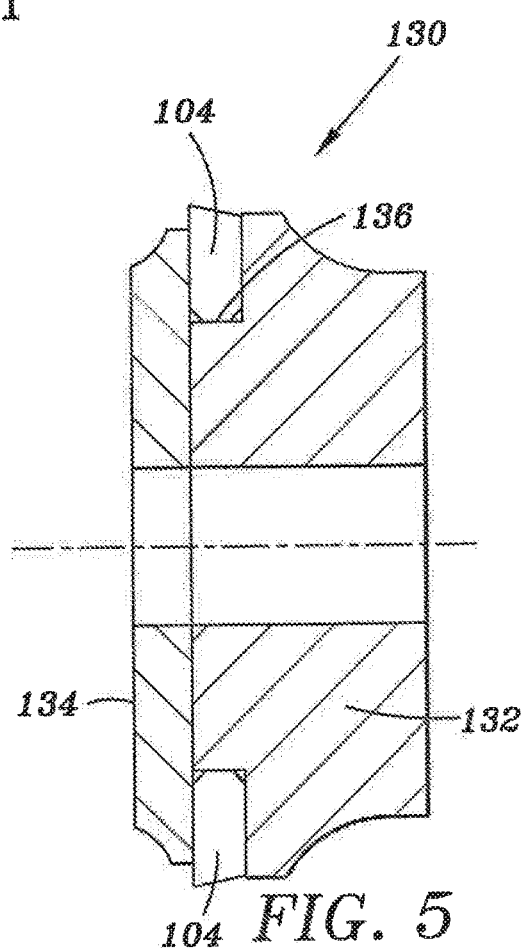
FIG. 5 is a cross-section of an alternate embodiment of the adzer bit of FIG. 4.
Figure 3C:
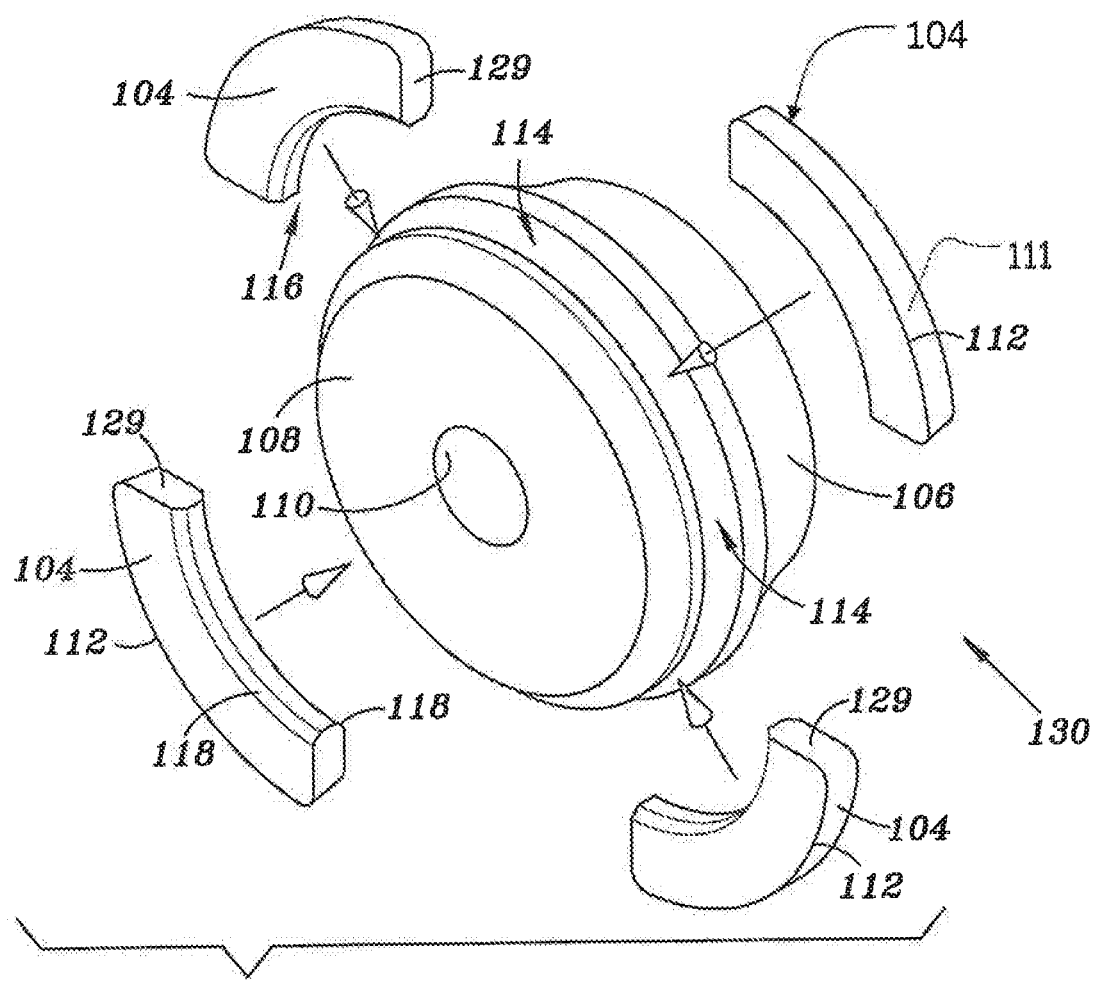
FIG. 3C is an exploded isometric view of the adzer bit of FIG. 3A.
Figure 4:
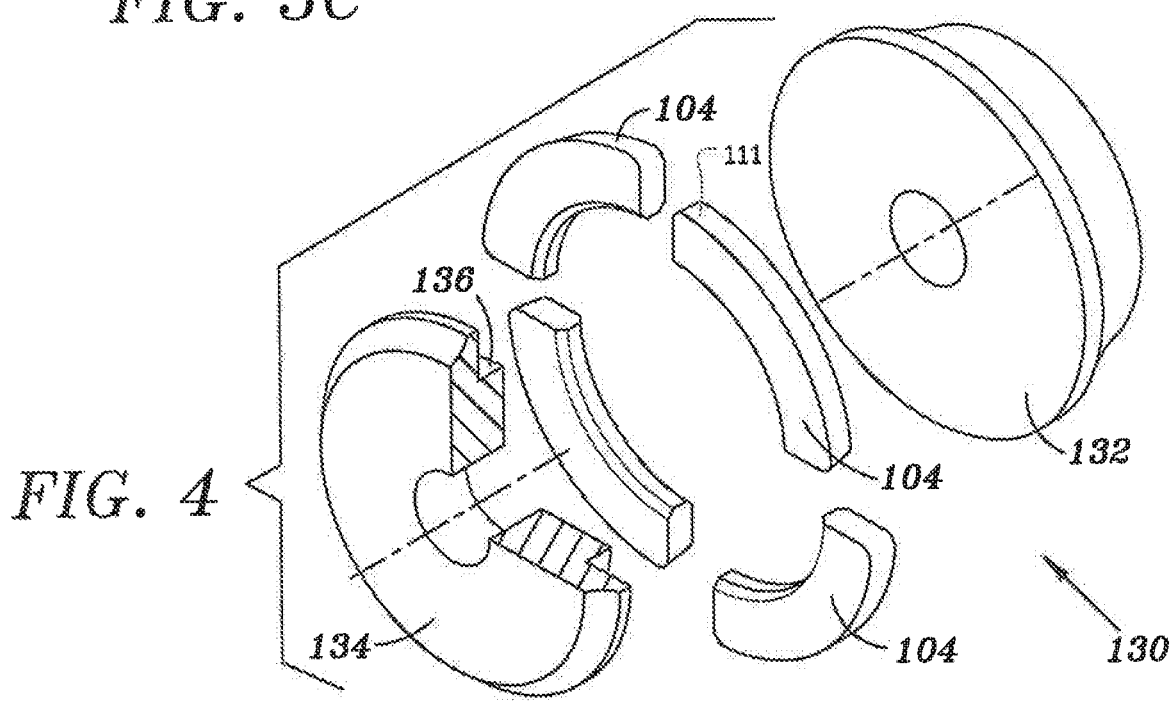
FIG. 4 is an exploded isometric view of an alternate embodiment of an adzer bit according to the teachings of the present disclosure.

Reference is made to FIG. 4, which illustrates an exploded view of an alternate embodiment of an adzer bit 130 according to the teachings of the present disclosure. The adzer bit 130 includes a separate base member 132 and a separate cap 134 that leads and shields and protects the cutting segments 104. A support boss 136 extends from the cap 134, or alternatively from the base member 132, as shown in cross-section in FIG. 5. In an alternate embodiment, the support boss 136 may be a separate structure that is bonded or otherwise secured between the cap 134 and the base member 132. In any event, the cutting segments 104 are positioned peripherally around the support boss 136 and are secured to the support boss 136 and either the base member 132 or the cap 134 or both the cap 134 and the base member 132 by any suitable bonding process, such as braising, or any the other bonding process described above with respect to FIGS. 3A-3C. The cap 134 and/or the base member 132 may be formed from any suitable material that is less hard than the material of the cutting segments 104. For example, both the cap 134 and the base member 132 may be formed from a mild steel, such as A36 grade steel. Alternatively, the base member 132 and the support boss 136 may be formed of a mild steel to facilitate machining, and the cap 134 may be formed from a hardened steel or hard material such as manganese or an air hardened steel, such that it is more resistant to wear, which may be more important for the cap 134 because it leads the cutting segments 104 when the adzer head is rotated, so it is more susceptible to encountering a hard foreign object, like a rock, while adzing railroad crossties. The cutting segments 104 are formed of a ultra-hard material, such as tungsten carbide, a ceramic, a tool steel, or a diamond material, as described above with respect to FIG. 3B.

The cutting segments 104 of adzer bits 100 and 130 form a ring shape, which is similar to the annular cutting structure of conventional adzer bits, but according to the teachings of the present disclosure, any crack in an individual cutting segment 104 will be isolated to the particular cutting segment 104 and will not propagate to an adjacent cutting segment 104 because the cutting segments 104 are separate structures. Thus, if a cutting segment 104 is cracked or otherwise fractured or chipped, that particular cutting segment 104 may become less useful as a cutter, but the remaining segments 104 of the ring shape will continue to function as effective cutters.

The foregoing describes only some embodiments of the invention(s), and alterations, modifications, additions and/or changes can be made thereto without departing from the scope and spirit of the disclosed embodiments, the embodiments being illustrative and not restrictive. In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An adzer bit, comprising:
    a support member comprising a base portion and a cap portion, the cap portion formed of a first material; and
    a plurality of cutting segments axially disposed between the base portion and the cap portion and formed of a second material, the second material being harder than the first material, wherein each cutting segment comprises a leading surface, an outer arcuate surface, and a cutting edge disposed at a junction of the leading surface and the outer arcuate surface; and
    wherein each cutting segment is defined by the outer arcuate surface, an inner arcuate surface, and a plurality of opposed end surfaces, an end surface of a first cutting segment being disposed adjacent an end surface of a second cutting segment;
    wherein the base portion and the cap portion define a through hole configured to receive a fastener to couple the adzer bit to an adzer head.

2. The adzer bit of claim 1 wherein the plurality of cutting segments forms an annulus.

3. The adzer bit of claim 1 wherein a segment support boss is axially disposed between the base portion and the cap portion and the plurality of cutting segments are peripherally disposed around the segment support boss.

4. The adzer bit of claim 1 wherein the second material comprises tungsten carbide.

5. The adzer bit of claim 1 wherein the first material comprises steel.

6. The adzer bit of claim 1 wherein the plurality of cutting segments comprises four cutting segments.

7. The adzer bit of claim 1 further comprising a brazing material securing the plurality of cutting segments between the base portion and the cap portion.

8. The adzer bit of claim 1 wherein the cutting edge of each one of the plurality of cutting segments extends radially beyond a perimeter of the cap portion.

9. The adzer bit of claim 1 wherein the cap portion and the base portion are portions of a single unitary body defining an annular slot formed in the single unitary body, the plurality of cutting segments being received in the annular slot.

10. The adzer bit of claim 1 wherein the cap portion is joined to the base portion.

11. The adzer bit of claim 1 wherein the leading surface is a planar surface that contacts a corresponding surface of the cap portion.

12. The adzer bit of claim 1 wherein the outer arcuate surface forms an acute angle with the leading surface.

13. A method for forming an adzer bit, comprising:
securing a plurality of cutting segments to a support member comprising a cutting segment cap portion and a base portion, the plurality of cutting segments being secured axially between the cutting segment cap portion and the base portion, each of the plurality of cutting segments defining a leading surface, an outer arcuate surface, and a cutting edge disposed at a junction of the leading surface and the outer arcuate surface, the cutting edge extending radially beyond a periphery of the cutting segment cap portion, an end of a first cutting segment disposed adjacent an end of a second cutting segment, and the support member comprising a first material and the plurality of cutting segments comprising a second material, the second material being harder than the first material, wherein the base portion and the cutting segment cap portion define a through hole configured to receive a fastener to couple the adzer bit to an adzer head.

14. The method of claim 13 wherein each one of the plurality of cutting segments comprises tungsten carbide and wherein securing the plurality of cutting segments comprises brazing the plurality of cutting segments within an annular slot formed in the support member.

15. The method of claim 13 wherein each one of the plurality of cutting segments comprises tungsten carbide and wherein securing the plurality of cutting segments comprises brazing the plurality of cutting segments peripherally around a support boss disposed between the cutting segment cap portion and the base portion.

16. The method of claim 13 wherein the support member is a unitary body and further comprising machining an annular slot in the support member, and wherein securing the plurality of cutting segments further comprises positioning each one of the plurality of cutting segments at least partially within the annular slot.

17. The method of claim 13 further comprising joining the cutting segment cap portion to the base portion.

18. An adzer bit, comprising:
a support member comprising a base portion and a cap portion, the cap portion formed of a first material; and
a plurality of cutting segments axially disposed between the base portion and the cap portion and forming an annulus, the plurality of cutting segments formed of a second material, the second material being harder than the first material, wherein each cutting segment comprises a leading surface, an outer arcuate surface, and a cutting edge disposed at a junction of the leading surface and the outer arcuate surface;
a brazing material securing the plurality of cutting segments between the base portion and the cap portion; and
wherein each cutting segment is defined by the outer arcuate surface, an inner arcuate surface, and a plurality of opposed end surfaces, an end surface of a first cutting segment being disposed adjacent an end surface of a second cutting segment;
wherein the base portion and the cap portion define a through hole configured to receive a fastener to couple the adzer bit to an adzer head.

19. The adzer bit of claim 18 wherein the cap portion and the base portion are portions of a single unitary body defining an annular slot formed in the single unitary body, the plurality of cutting segments being received in the annular slot.

20. The adzer bit of claim 18 wherein the cap portion is joined to the base portion.

* * * * *